United States Patent
Chen et al.

(10) Patent No.: US 10,259,582 B2
(45) Date of Patent: Apr. 16, 2019

(54) AIRCRAFT CABIN ARRANGEMENT WITH OPTIMIZED PASSENGER AND CREW SERVICE AREAS

(71) Applicant: B/E Aerospace, Inc., Wellington, FL (US)

(72) Inventors: Ting-Yu Chen, Delft (NL); Glenn Johnson, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 261 days.

(21) Appl. No.: 15/245,415

(22) Filed: Aug. 24, 2016

(65) Prior Publication Data

US 2017/0057638 A1    Mar. 2, 2017

Related U.S. Application Data

(60) Provisional application No. 62/210,064, filed on Aug. 26, 2015.

(51) Int. Cl.
| | |
|---|---|
| *B64D 11/04* | (2006.01) |
| *B64D 11/00* | (2006.01) |
| *B64D 11/02* | (2006.01) |
| *B64D 11/06* | (2006.01) |

(52) U.S. Cl.
CPC .......... *B64D 11/04* (2013.01); *B64D 11/0015* (2013.01); *B64D 11/02* (2013.01); *B64D 11/0639* (2014.12); *B64D 11/0691* (2014.12)

(58) Field of Classification Search
CPC ............ B64D 11/0691; B64D 11/0639; B64D 11/0015; B64D 11/04
See application file for complete search history.

(56) References Cited

U.S. PATENT DOCUMENTS

| | | | | |
|---|---|---|---|---|
| 4,774,514 A | * | 9/1988 | Hildebrandt ............ | A63F 13/12 340/3.71 |
| 6,177,887 B1 | * | 1/2001 | Jerome ............... | B64D 11/0007 340/5.9 |
| 7,178,954 B2 | * | 2/2007 | Blechschmidt ........ | B64D 11/00 244/118.5 |
| 8,469,311 B2 | * | 6/2013 | Saint-Jalmes ...... | B64D 11/0691 244/118.5 |
| 9,096,319 B2 | * | 8/2015 | Klettke ................. | B64D 11/00 |
| 9,108,716 B2 | * | 8/2015 | Boren .................... | B64D 11/04 |
| 9,580,176 B2 | * | 2/2017 | Ehlers ................... | B64D 11/00 |
| 2007/0018046 A1 | * | 1/2007 | Boren .................... | B64D 11/04 244/118.6 |
| 2016/0059953 A1 | * | 3/2016 | Fagan ............... | B64D 11/0015 701/3 |

* cited by examiner

*Primary Examiner* — Brian M O'Hara
*Assistant Examiner* — Keith L Dixon
(74) *Attorney, Agent, or Firm* — Clements Bernard Walker PLLC

(57) ABSTRACT

An aircraft galley is provided, including a first galley unit that includes meal carts, cabinets and a countertop-height work area and a second galley unit that includes a countertop-height work area and a plurality of deployable crew seats and with the first galley unit defines a crew work/interaction area. A passenger interaction screen is positioned for viewing by passengers boarding the aircraft and passing through the galley into a passenger cabin. A plurality of lavatories are positioned in a like plurality of corners of the galley and having respective major walls positioned at an oblique angle to a longitudinal axis of the aircraft and with respective doors angled away from the crew work/interaction area.

4 Claims, 8 Drawing Sheets

AIRCRAFT CABIN ARRANGEMENT WITH OPTIMIZED PASSENGER AND CREW SERVICE AREAS

CROSS-REFERENCE TO RELATED APPLICATIONS AND PRIORITY

This present application claims priority from and incorporates by reference the full contents of a provisional patent application filed on Aug. 26, 2015, Application No. 62/210,064.

TECHNICAL FIELD AND BACKGROUND OF THE INVENTION

This application relates to an aircraft interior configuration that optimizes the service areas for both passengers and crew. The new design focuses on improving the flight experience of aircraft occupants based on factors that are often overlooked in improving cabin interiors—the cabin crew. At the same time, features are provided that enable revenue passengers to benefit from the atmosphere created by improving working conditions and ambience of the crew. The invention has particular application in wide body aircraft such as the Boeing 777X and 787 series aircraft.

Modern wide body aircraft have a series of doors that extend in spaced relation along the sides of the aircraft to permit simultaneous ingress and egress of passengers into the various service level areas of the aircraft. "Door 1" leads into the area directly aft of the cockpit area. The "Door 2" area typically leads to the business/premium class "Zone A" area to the left and the business class area to the right. The "Door 2" area typically includes several lavatories, galley units and fold-up crew seating for taxi, take-off and landing ("TTOL") phases of travel.

In accordance with the disclosure of the invention described in this application, the overall service provisions and how all the products are perceived—including the seats, the galley area, the lavatories and the cabin crew—have been elevated by providing better working conditions and functional features to the cabin crew while increasing and improving the utilization and ambiance of the cabin entry and socializing areas for the passengers. The concept uses the 'grand foyer' concept of hotel and retail design to elevate the reception of crew and passengers as to the overall level of service provision via these design innovations. This concept elevates the reception of crew and passengers to an overall higher level of amenities and service by incorporating design innovations unique to aircraft.

SUMMARY OF THE INVENTION

It is therefore an object of the invention to provide an aircraft interior configuration that optimizes the service areas for both passengers and crew.

It is another object of the invention to provide an area that enables images and lighting patterns representing different moods to be projected onto surfaces adjacent passenger entryways to provide information and create a more welcoming entrance for the ingressing passengers.

It is another object of the invention to provide a greater open area for the passengers upon entry into the cabin.

It is another object of the invention to provide a cabin crew seating area in which the seats have been repositioned to allow more social interaction and access by the cabin crew to their own personal stowages.

It is another object of the invention to provide the cabin crew with interactive personal profiles to enable them to log their own performance more accurately.

These and other objects and advantages of the present invention are achieved in the preferred embodiment disclosed below by providing an aircraft interior configuration that optimizes the service areas in the area of the passenger ingress and egress doors for both passengers and crew.

According to one embodiment of the invention, a galley is provided for being positioned within an aircraft fuselage and includes a first galley unit that includes meal carts, cabinets and a countertop crew work area and a second galley unit spaced-apart from the first galley unit along a longitudinal axis of the fuselage and that includes a countertop work area and a plurality of deployable crew seats, the first galley unit and the second galley unit and the spaced-apart area between the first galley unit and the second galley unit defining a crew work/interaction area.

According to another embodiment of the invention, a passenger interaction screen is positioned for viewing by passengers boarding the aircraft through a door in the aircraft fuselage and passing through the galley into a passenger cabin. The screen is adapted to display flight information relevant to passengers boarding the aircraft.

According to another embodiment of the invention, a passenger interaction screen is provided and is positioned for viewing by passengers boarding the aircraft through a door in the aircraft fuselage and passing through the galley into a passenger cabin, the screen adapted to display flight information relevant to passengers boarding the aircraft and to display selected, varying patterns of light conducive to passenger comfort.

According to another embodiment of the invention, a plurality of lavatories are positioned in a like plurality of corners of the galley and have respective major walls positioned at an oblique angle to a longitudinal axis of the aircraft fuselage and with respective lavatory door openings angled away from the crew work/interaction area.

According to another embodiment of the invention, the countertop work area of the first galley unit defines an "L" shape for permitting cabin crew access to the countertop work area from two directions perpendicular to each other.

According to another embodiment of the invention, the countertop work area of the second galley unit defines an "L" shape for permitting cabin crew access to the countertop work area from two directions perpendicular to each other.

According to another embodiment of the invention, at least one of the first and second galley units include a plurality of crew seats that are movable between a stowed position against the at least one of the first and second galley units and a deployed position extending away from the at least one of the first and second galley units for use by the crew.

According to another embodiment of the invention, the plurality of seats is pivotally-mounted on a deck of the aircraft by respective bases for movement between the stowed and deployed positions.

According to another embodiment of the invention, the countertop work area of the first galley unit defines an "L" shape for permitting cabin crew access to the countertop work area from two directions perpendicular to each other, and the countertop work area of the second galley unit defines an "L" shape for permitting cabin crew access to the countertop work area from two directions perpendicular to each other. One leg of the "L" shape of the countertop work area of the first galley unit extends along the longitudinal axis of the aircraft fuselage and one leg of the "L" shape of the countertop work area of the second galley unit extends along the longitudinal axis of the aircraft fuselage.

According to another embodiment of the invention, the one leg of the "L" shape of the countertop work area of the first galley unit faces a port side of the fuselage and the one leg of the "L" shape of the countertop work area of the second galley unit faces a starboard side of the fuselage.

According to another embodiment of the invention, a plurality of lavatories are positioned in a like plurality of corners of the galley and having respective major walls positioned at an oblique angle to the longitudinal axis of the fuselage. The respective major walls include at least one crew seat having a seat bottom that is movable between a stowed position against the respective major walls and a deployed position with the seat bottom of the crew seat extending horizontally outwardly from the wall for use by a seated crew member.

According to another embodiment of the invention, the plurality of lavatories includes respective lavatory door openings angled away from the crew work/interaction area.

According to another embodiment of the invention, at least one of the first galley unit or the second galley unit defines a "U" shape having an interior aspect opening into a passenger cabin fitted with at least one passenger seat and an exterior aspect around which are positioned fixtures of the at least one of the first galley unit or the second galley unit.

According to another embodiment of the invention, a passenger interaction screen is mounted on the exterior aspect of the "U"-shaped galley unit facing an aircraft fuselage passenger-boarding door.

According to another embodiment of the invention, a galley is provided for being positioned within a fuselage of an aircraft and includes a first galley unit that includes meal carts, cabinets and a crew countertop work area, a second galley unit spaced-apart from the first galley unit along a longitudinal axis of the fuselage and a passenger interaction screen positioned for viewing by passengers boarding the aircraft through an aircraft fuselage door and passing through the galley into a passenger cabin. The screen is adapted to display flight information relevant to passengers boarding the aircraft and to display selected, varying patterns of light conducive to passenger comfort. A plurality of lavatories are positioned in a like plurality of corners of the galley and have respective major walls positioned at an oblique angle to a longitudinal axis of the aircraft fuselage with respective lavatory door openings angled away from the crew work/interaction area. At least one of the first and second galley units including a plurality of crew seats that are movable between a stowed position against the at least one galley unit and a deployed position extending away from the at least one galley unit for use by the crew. The plurality of seats is pivotally mounted on a deck of the aircraft by respective bases for movement between the stowed and deployed positions.

According to another embodiment of the invention, the second galley unit includes a countertop work area and a plurality of deployable crew seats.

According to another embodiment of the invention, at least one of the first galley unit or the second galley unit has a "U" shape with an interior aspect opening into the passenger cabin and fitted with at least one passenger seat and an exterior aspect around which are positioned fixtures of the at least one of the first galley unit or the second galley unit.

According to another embodiment of the invention, a passenger interaction screen is mounted on an exterior aspect of the "U"-shaped galley unit facing an aircraft fuselage door.

According to another embodiment of the invention, the countertop work area of the first galley unit defines an "L" shape for permitting cabin crew access to the countertop work area from two directions perpendicular to each other and the countertop work area of the second galley unit defines an "L" shape for permitting cabin crew access to the countertop work area from two directions perpendicular to each other. One leg of the "L" shape of the countertop work area of the first galley unit extends along the longitudinal axis of the aircraft fuselage and one leg of the "L" shape of the countertop work area of the second galley unit extends along the longitudinal axis of the aircraft fuselage. One leg of the "L" shape of the countertop work area of the first galley unit faces a port side of the fuselage and the one leg of the "L" shape of the countertop work area of the second galley unit faces a starboard side of the fuselage.

According to another embodiment of the invention, a galley is provided for being positioned within a fuselage of an aircraft and includes a first galley unit that includes meal carts, cabinets and a countertop crew work area and a second galley unit spaced-apart from the first galley unit along a longitudinal axis of the fuselage that includes a countertop work area and a plurality of deployable crew seats, the first galley unit and the second galley unit defining a crew work/interaction area. A passenger interaction screen is positioned on one wall of one or the other of the first galley unit and the second galley unit for viewing by passengers boarding the aircraft through an aircraft fuselage door and passing through the galley into a passenger cabin. The screen is adapted to display flight information relevant to passengers boarding the aircraft. The screen extends from a position proximate a deck surface of the aircraft upwardly to a height at least as high as the height of the wall of one or the other of the first galley unit and the second galley unit.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT AND BEST MODE

Figure 1:
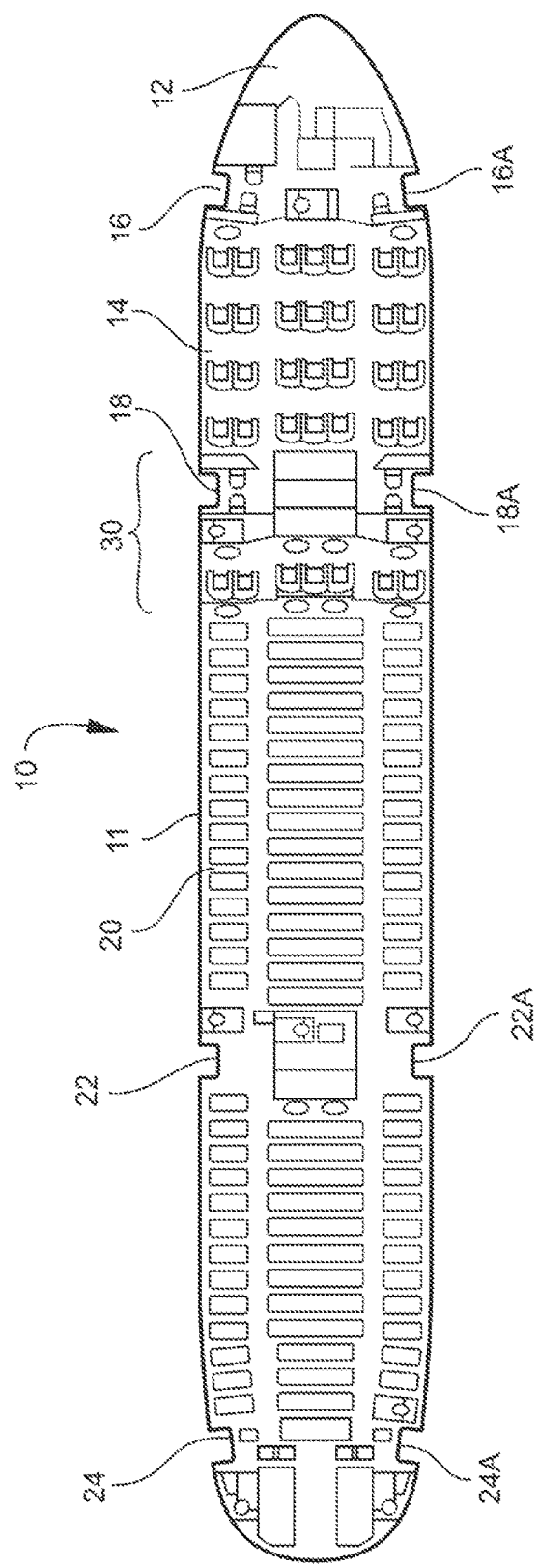
FIG. 1 is a plan view of a layout of a Boeing 777 wide body jet passenger aircraft, including a prior art galley arrangement.

Referring now to the drawings, a schematic plan view of a typical interior of a Boeing 777 is shown at reference numeral 10, the fuselage 11 of which includes a cockpit 12, a business/premium class cabin 14 entered through a door 16 and a door 18, and an economy class cabin 20 entered through doors 18 and 22. Doors 24, 24A are typically used by the crew for service item loading and unloading and for emergencies. As shown, door 18 is positioned aft of the business/premium class cabin 14 and forward of the economy class cabin 20. Business/premium class passengers enter the aircraft through door 18 and turn left. Economy class passengers seating in the forward-most seats enter the aircraft through door 18 and turn right into the economy class cabin 20.

The door 18 is referred to in the aircraft industry as "Door 2." The business/premium class area is typically referred to as "Zone A" and these designations are used interchangeably. Also, as shown in FIG. 1, doors on the starboard side of the aircraft positioned opposite doors 16, 18, 22 and 24 are indicated at reference numerals 16A, 18A, 22A and 24A. Either or both sets of doors maybe used for ingress and egress depending on the boarding and deplaning facilities available and, of course, in the event of an emergency evacuation.

Figure 2:
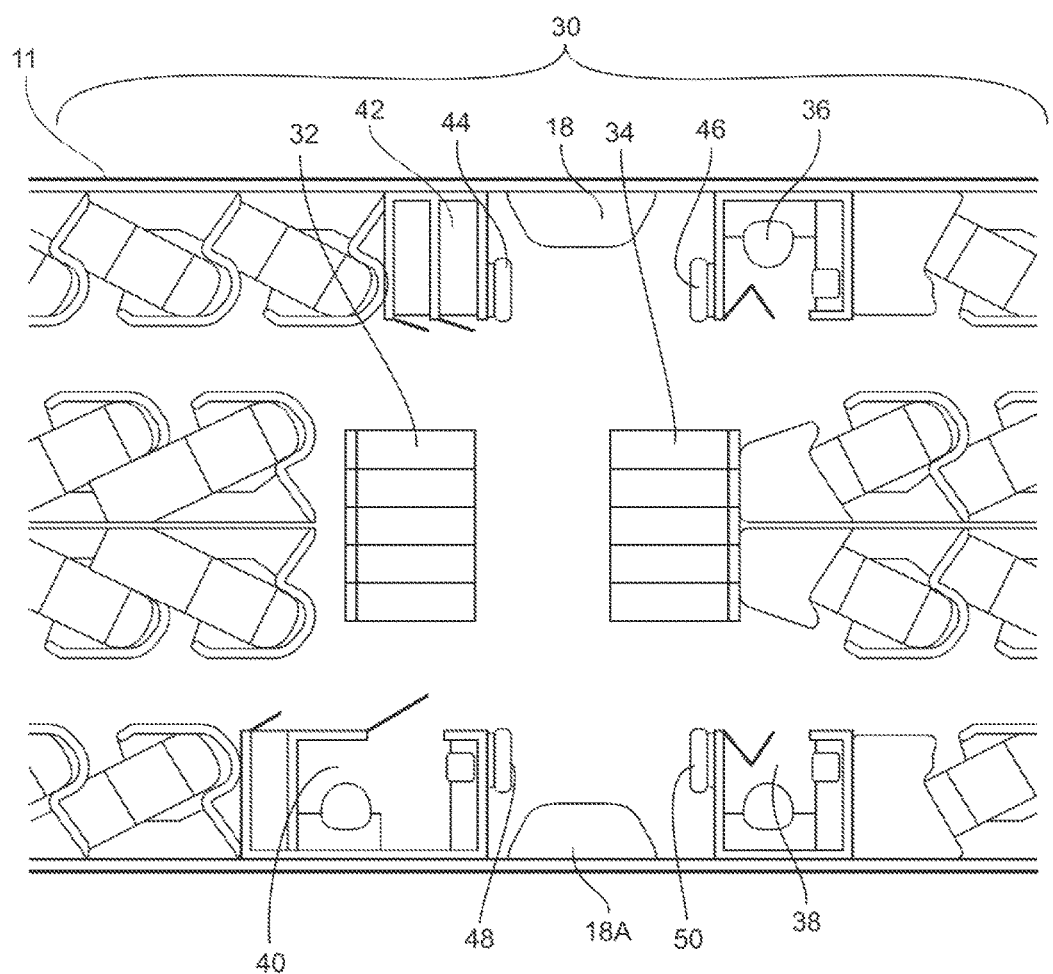
FIG. 2 is a plan view of a conventional layout of the "Door 2" area of an aircraft cabin according to the prior art.

A galley area 30 is located in the aircraft between doors 18, 18A ("Doors 2") and the business/premium class cabin 14 and the economy class cabin 20. As best shown in FIG. 2, this galley area 30, which may be configured differently in aircraft flown by different carriers and varies from the galley shown in FIG. 1, typically includes two galley units 32, 34 which contain meal carts, storage cabinets, coffeemakers and the like, separated by a transverse aisle. Lavatories 36, 38 and 40 occupy three of the four corners of the galley area, with a closet 42 or other facility located in the fourth corner. Fold-down flight attendant jump seats 44, 46, 48 and 50 are positioned as shown. This typical prior art arrangement results in a relatively congested area being used by passengers and crew during boarding, travel and deplaning. Very little space for social interaction is provided except immediately proximate the lavatories 36, 38 and 40.

Figure 3:
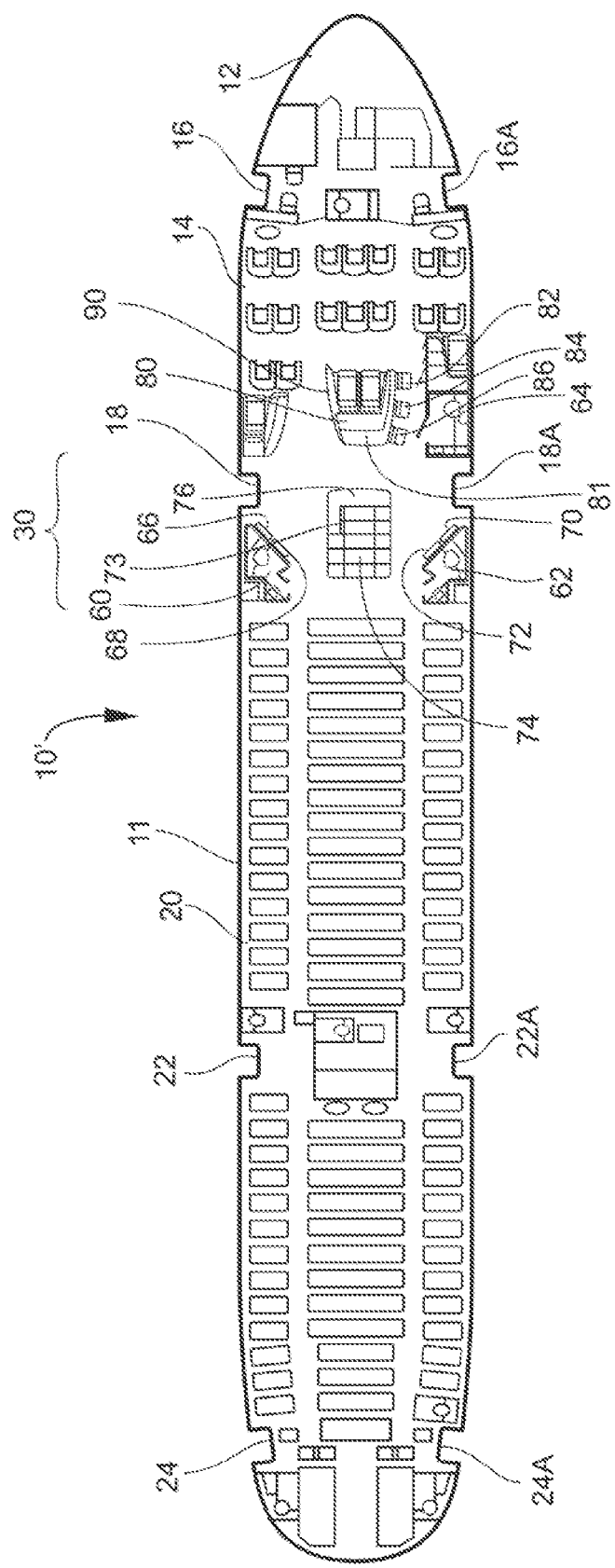
FIG. 3 is a plan view of a layout of a Boeing 777 aircraft cabin according to one preferred embodiment of the present invention, showing the galley in one preferred orientation.

Referring now to FIGS. 3-8, a revised galley area according to several variations is disclosed and illustrated with reference to an interior floor plan 10', where like elements are referred to using like reference numerals. Despite accommodating the same space as prior art galleys, that space is more efficiently used to provide an improved work and seating area for the crew and a more attractive and socially-interactive area for passengers. As shown in FIG. 3, the galley area 30 has been re-designed to include three lavatories 60, 62, 64, two of which, 60 and 62, are positioned in corners with angled sidewalls to open up the area directly in front of the lavatories 60 and 62. This moves the bi-fold doors of the lavatories 60 and 62 away from the social area of the galley area 30 and provides walls on which to mount cabin crew jump seats 66, 68, 70 and 72. The cabin crew jump seats 66, 68, 70 and 72 allow more social interaction between the cabin crew members and improved access to their own personal stowages. There are also interactive personal profile boards 73 for the crew to enable them to log their own performance more accurately.

As best shown in FIGS. 5-8, the galley meal carts 75 and service units 77 are moved to one side of the galley area 30 and consolidated into a single "L"-shaped galley unit 74 that permits cabin crew access to the countertop work area from two directions perpendicular to each other, and which includes a countertop work area 76. A second "L"-shaped galley unit 80 provides additional countertop work area 81 for the cabin crew that also permits cabin crew access to the countertop work area from two directions perpendicular to each other, and which later in flight can be converted into a more social crew area with flip down seats 82, 84 and 86 which stow against the second galley unit 80 and deploy outwardly. Other galley unit shapes maybe used based on galley size, aisle width, lavatory location and similar factors.

The configuration of this galley unit 80 permits it to be sculpted to fit the adjacent passenger seats, whether business class or economy class seats, as described in further detail below. As also shown in FIG. 3, a passenger interaction screen 90 is provided that is visible to passengers as they enter the aircraft through door 18A. The screen 90 is positioned for viewing during boarding and while passengers are in the galley area. The screen 90 is formed of a projection screen, LED or other display screen that can provide mood setting images (FIGS. 6 and 8), flight information or any other desired images or information during various flight stages.

The coffeemakers 79 of the galley unit 80 are repositioned at countertop table height to prevent scalding. This arrangement also enables the crew to have a more social area angled towards and away from the passenger social area to enable a more controlled level of interactions between passengers and crew. The redesigned area permits the crew to provide a better quality of service. The monuments are sculpted to reflect the design of a business class seat layout that integrates the design and permits passengers to benefit from an improved area of entry into the premium class area. The design layout improves the capacity of the Zone A density for seat layouts and creates a better area for crew workflows and information exchange.

Figure 7:
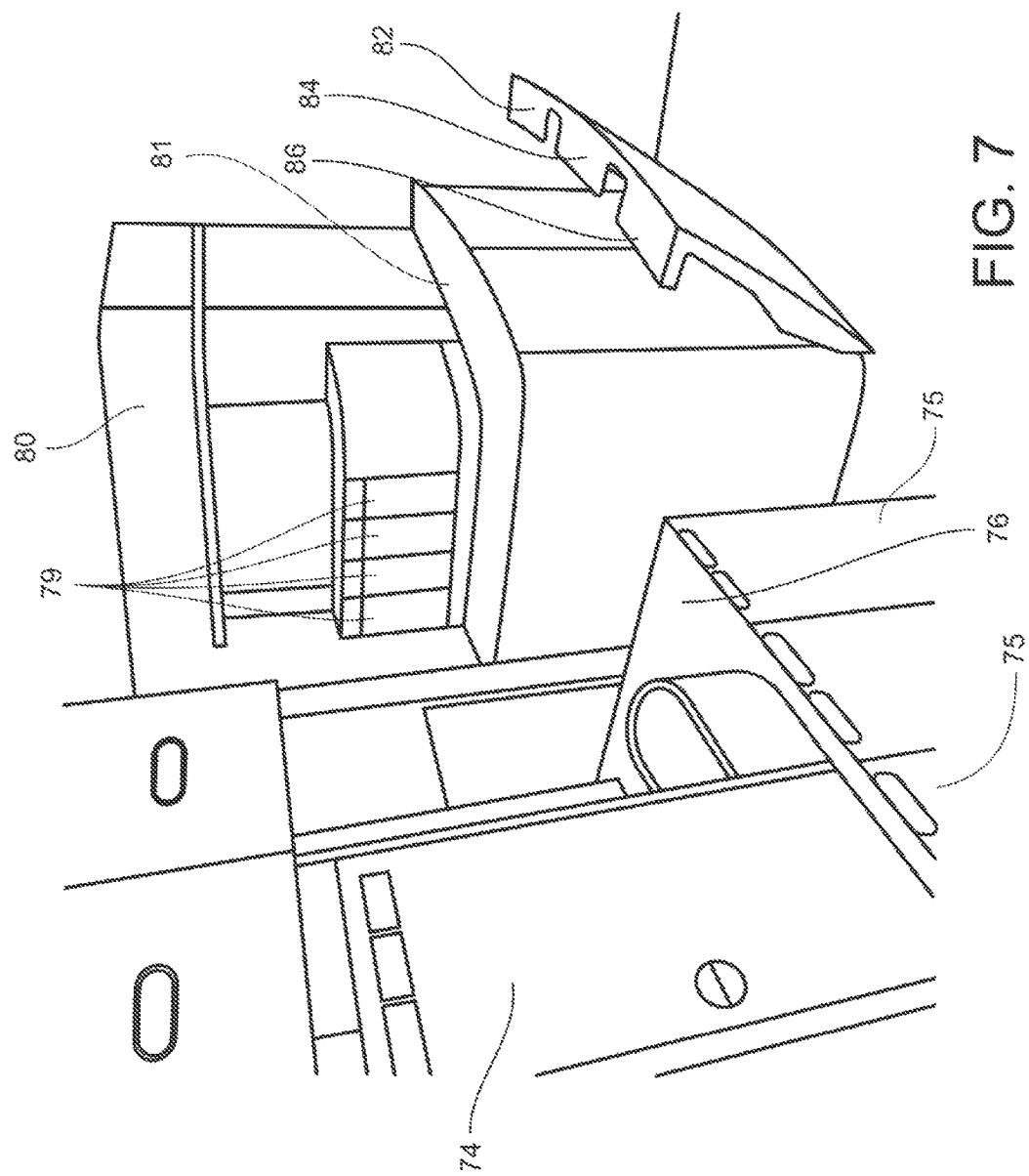
FIG. 7 is a perspective view of the galley area of the layout shown in FIG. 4, viewed from a position at a right angle from the view of FIG. 6.
Figure 8:
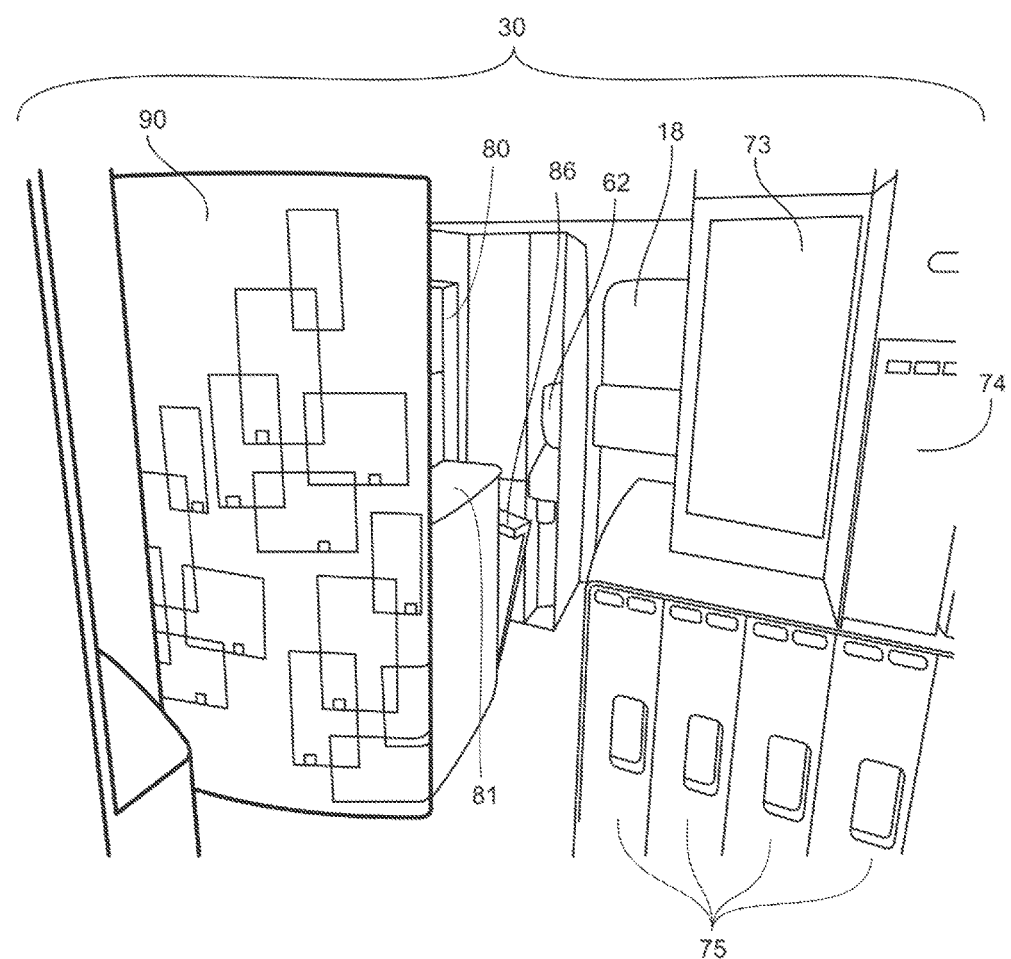
FIG. 8 is an enlarged view similar to FIG. 6 illustrating the ability to vary the projection screen image to provide enhanced passenger and crew ambiance.

FIG. 7 shows the arrangement of flip down seats 82, 84, 86 which are positioned to fold up against the second service unit when not in use and to be deployed, as needed, for use by the cabin crew. The countertop 81 provides a work surface for the cabin crew when preparing flight papers or for food and beverage when relaxing or dining.

Figure 4:
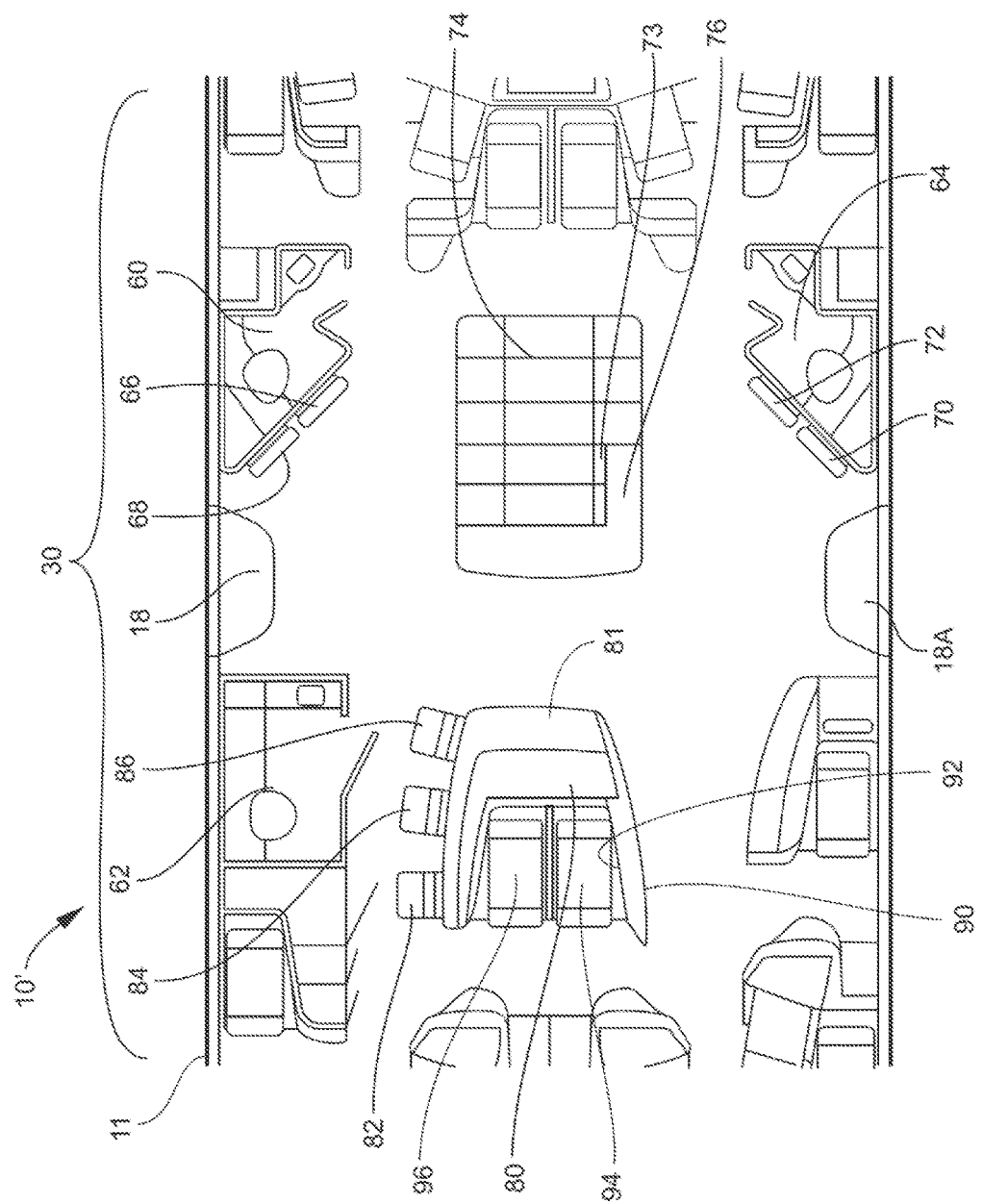
FIG. 4 is a plan view of a layout of the galley in a further alternative preferred orientation.
Figure 5:
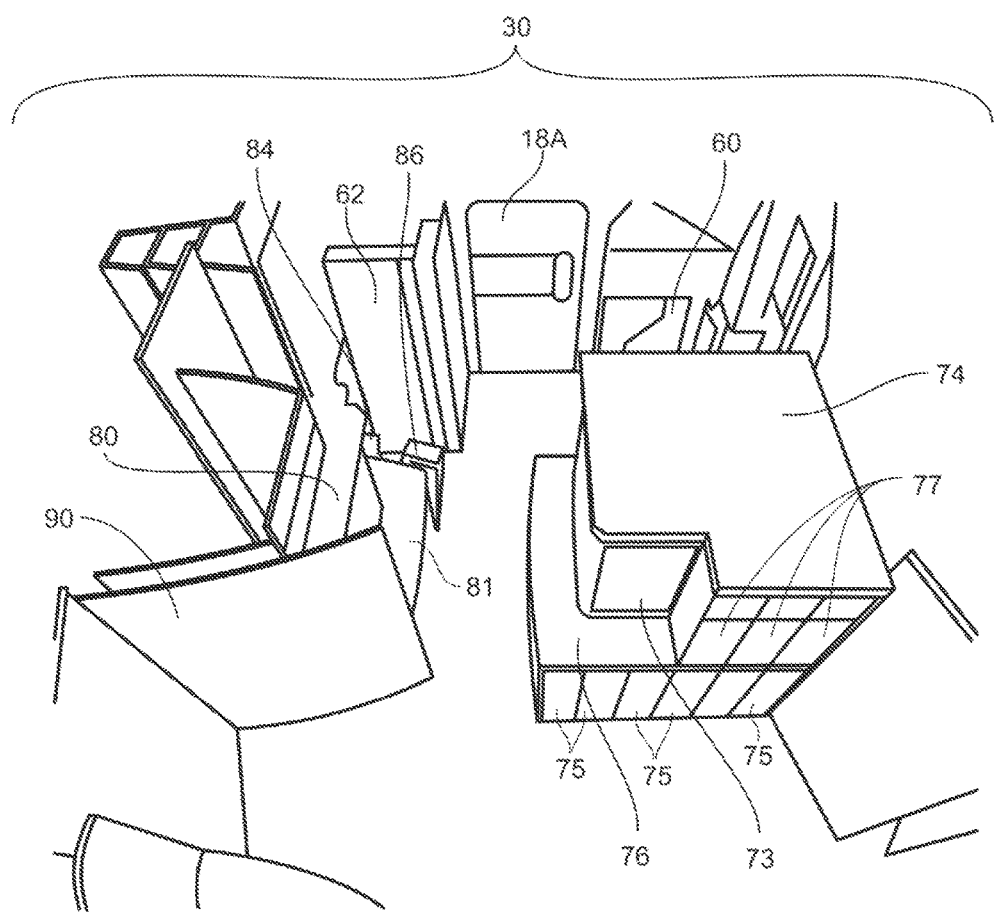
FIG. 5 is a perspective view of the view of the galley according to the orientation shown in FIG. 4.
Figure 6:
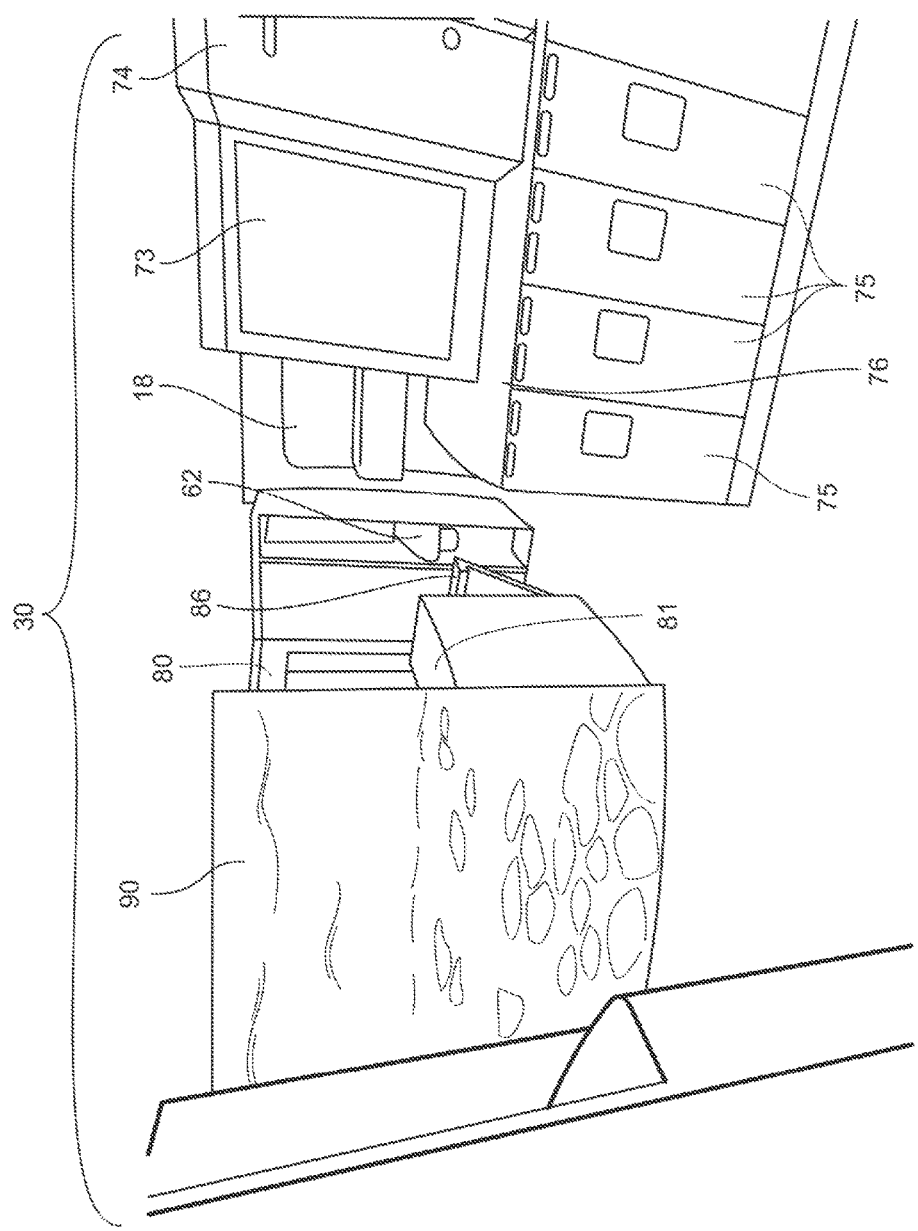
FIG. 6 is a lower angle perspective view of the galley shown in FIG. 5.

As best shown in FIG. 4, the galley unit 80 has a sculpted "U" shape, the interior aspect 92 of which provides a recess in which passengers seats 94, 96 can be placed, further utilizing space that would otherwise be wasted, while the exterior aspect of the galley unit 80 performs the crew-related functions described above.

The various orientations of the galley units described above provide flexibility in complying with airline and terminal loading requirements as well as greater convenience and comfort for both passengers and the cabin crew.

An aircraft galley configuration is described above. Various details of the invention maybe changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A galley for being positioned within a fuselage of an aircraft, comprising:
   (a) a first galley unit comprising meal carts, cabinets and a first countertop work area;
   (b) a second galley unit spaced-apart from the first galley unit along a longitudinal axis of the fuselage and comprising a second countertop work area;

(c) a passenger interaction screen positioned for viewing by passengers boarding the aircraft through an aircraft fuselage door and passing by at least one of the first and second galley units into a passenger cabin, the passenger interaction screen displaying at least one of flight information relevant to passengers boarding the aircraft and varying patterns of light conducive to passenger comfort;

(d) a plurality of lavatories positioned in corners of the galley on opposite lateral sides of the first galley unit, each of the plurality of lavatories having a respective major wall positioned at an oblique angle to a longitudinal axis of the aircraft fuselage with respective lavatory door openings angled away from the first countertop work area; and (e) the second galley unit comprising a plurality of crew seats disposed along one lateral side of the second galley unit and facing the fuselage that are movable between a stowed position against the one lateral side and a deployed position extending away from the one lateral side for use by the crew, wherein the plurality of crew seats are pivotally-mounted for movement between the stowed and deployed positions.

2. An aircraft galley according to claim 1, wherein the second galley unit has a "U" shape with an interior aspect opening into the passenger cabin and fitted with at least one passenger seat and an exterior aspect around which are positioned fixtures of the second galley unit.

3. An aircraft galley according to claim 2, wherein the passenger interaction screen is mounted on the exterior aspect of the "U"-shaped second galley unit and faces an aircraft fuselage door.

4. An aircraft galley according to claim 3, wherein the first countertop work area of the first galley unit is "L"-shaped to permit cabin crew access to the first countertop work area from two directions perpendicular to each other and the second countertop work area of the second galley unit is "L"-shaped to permit cabin crew access to the countertop work area from two directions perpendicular to each other, wherein one leg of the first countertop work area of the first galley unit extends along the longitudinal axis of the aircraft fuselage and one leg of the second countertop work area of the second galley unit extends along the longitudinal axis of the aircraft fuselage, and wherein the one leg of the first countertop work area of the first galley unit faces a port side of the fuselage and the one leg of the second countertop work area of the second galley unit faces a starboard side of the fuselage.

* * * * *